T. L. TALIAFERRO.
METHOD OF FORMING CLOSURES FOR RECEPTACLES.
APPLICATION FILED SEPT. 6, 1919.
1,383,877. Patented July 5, 1921.
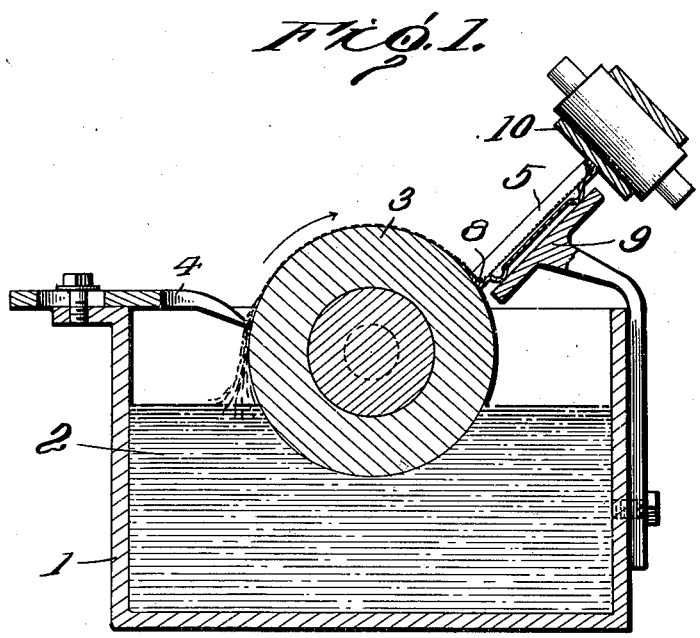
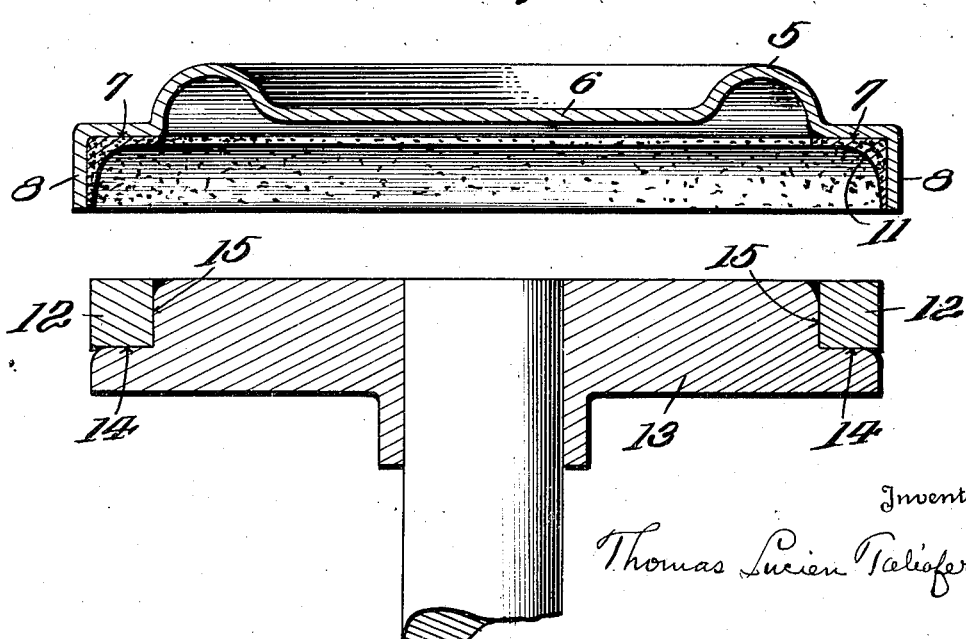

T. L. TALIAFERRO.
METHOD OF FORMING CLOSURES FOR RECEPTACLES.
APPLICATION FILED SEPT. 6, 1919.
1,383,877.
Patented July 5, 1921.
2 SHEETS—SHEET 2.
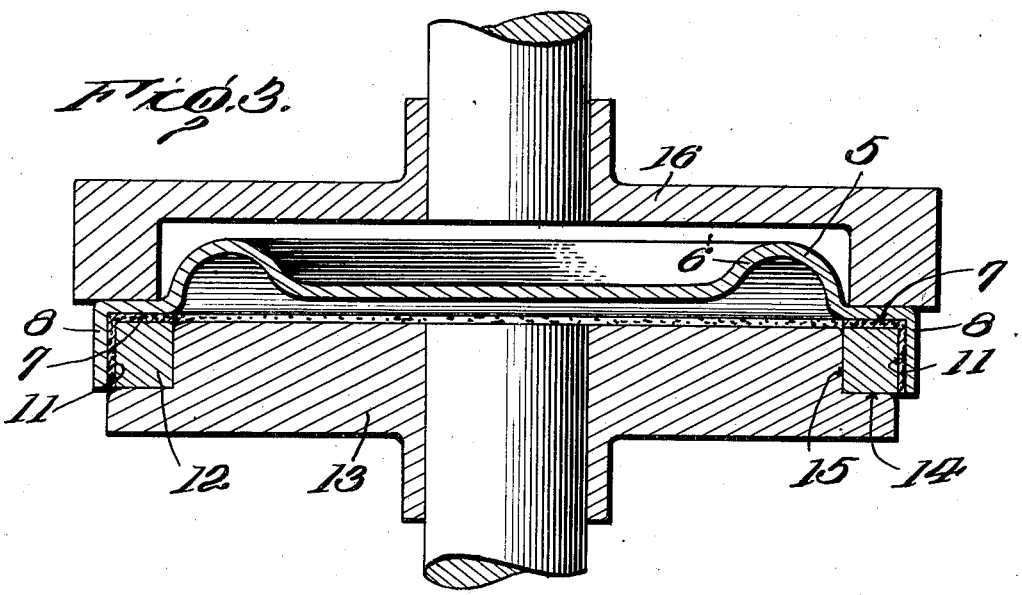
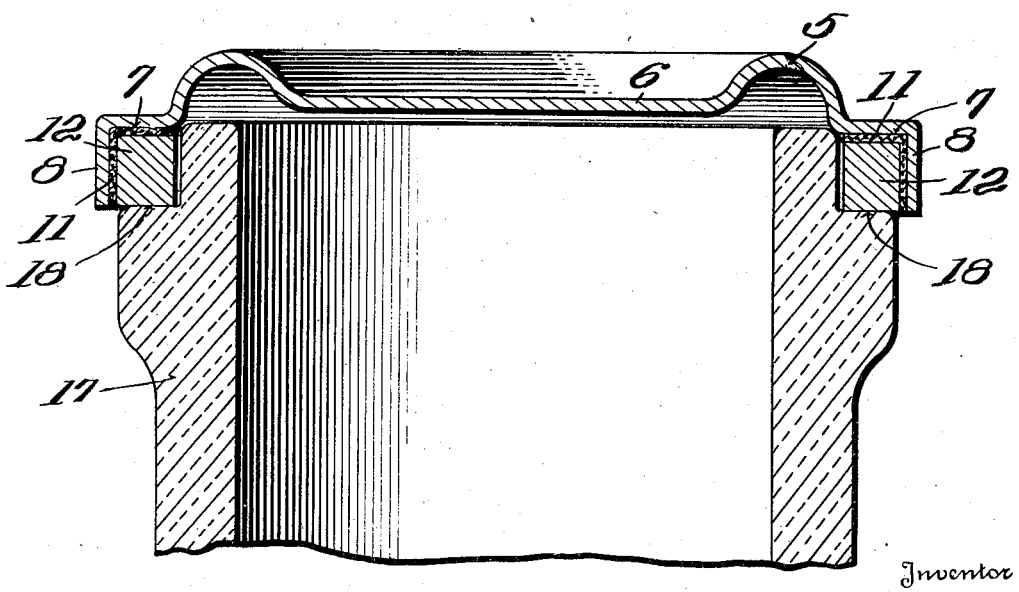
Inventor
Thomas Lucien Taliaferro
By Sturtevant & Mason
Attorneys

UNITED STATES PATENT OFFICE.

THOMAS LUCIEN TALIAFERRO, OF CHICAGO, ILLINOIS.

METHOD OF FORMING CLOSURES FOR RECEPTACLES.

1,383,877.  Specification of Letters Patent.  Patented July 5, 1921.

Application filed September 6, 1919. Serial No. 322,041.

*To all whom it may concern:*

Be it known that I, THOMAS LUCIEN TALIAFERRO, a citizen of the United States, residing at Chicago, in the county of Cook, State of Illinois, have invented certain new and useful Improvements in Methods of Forming Closures for Receptacles, of which the following is a description, reference being had to the accompanying drawing and to the figures of reference marked thereon.

The invention relates to new and useful improvements in the method of making closures for receptacles, and more particularly a closure for a glass or porcelain jar, or the like.

An object of the invention is to provide a method of forming closures for receptacles, wherein a vulcanized rubber gasket may be secured to the cap portion of the closure without requiring any bending or shaping of the metal parts of the closure.

A further object of the invention is to provide a method of forming closures wherein a vulcanized rubber gasket may be used, which gasket is secured to the closure by a rubber cement which firmly adheres both to the closure and the vulcanized rubber ring.

A still further object of the invention is to provide a method of forming closures, wherein a vulcanized rubber gasket is firmly secured to the metal parts of the closure by a rubber cement which may be vulcanized after being applied to the closure, so as to become, in a sense, a part of the rubber gasket and at the same time hold said rubber gasket firmly attached to the closure.

These and other objects will in part be obvious and will in part be hereinafter more fully disclosed.

In the drawings—

Figure 1 is a sectional view showing more or less diagrammatically, an apparatus for applying the rubber cement to the closure;

Fig. 2 is an enlarged view showing more or less diagrammatically, the gasket applied to the chuck and the closure about to be placed on the gasket;

Fig. 3 is a similar view but showing the pressing means as having forced the closure firmly into contact with the gasket;

Fig. 4 is an enlarged detail sectional view showing the closure having a gasket applied thereto by my improved method as placed on a receptacle.

The present invention is directed broadly to a method of applying a vulcanized rubber gasket to a metal closure, so that said gasket will be firmly secured to the closure, so that it may be shipped and handled with the closure without any danger of the gasket becoming detached therefrom. The invention is particularly adapted to the attachment of a vulcanized rubber gasket to a closure; and, by vulcanized rubber, I mean a rubber having sufficient vulcanizing material therein to form a more or less elastic gasket which of itself would not adhere either to the receptacle or to the metal of the closure. Such a gasket forms a very durable and efficient sealing means and one wherein the closure may be readily removed from the receptacle and the gasket remain intact upon the closure so that it may be again applied for resealing.

In carrying out the method the closure to which it is applied is first formed by cutting and shaping the metal and the closure is formed with a seat for the gasket. It is also preferably formed with a depending flange adjacent the gasket seat. After the closure has been thus formed, it is coated with a rubber cement so that said coating lies along the inner face of the depending flange and along the seat for the gasket. The gasket is then formed in any suitable way and is preferably ring shape and rectangular in cross section. The gasket is applied to a mandrel or chuck and then the closure placed on the chuck so that the gasket will come into contact with the seat on the closure. Pressure is then applied to the closure and heat may also be applied at the same time and the gasket firmly pressed against the seat. The expanding of the gasket when submitted to pressure also forces the same laterally against the depending flange and thus the gasket on two sides is brought intimately into contact with the cementing material which secures the gasket to the closure. This cementing material may be supplied with a vulcanizing agent, if desired, of sufficient quantity so that the heat will vulcanize said cement to a certain extent, thus causing the same to become in a measure an integral part of the rubber gasket and at the same time firmly adhere to the metal parts of the closure and thus firmly seating and securing the gasket to the closure.

Referring more in detail to the drawings, I have shown in Fig. 1, more or less diagrammatically, an apparatus for coating the closure. This apparatus is similar in construction to that shown in my prior Patent No. 1,089,350, granted March 3, 1914. Said apparatus consists of a tank 1 in which the rubber cement 2 is placed. Said rubber cement being preferably formed of Pará rubber put into solution by a solvent such as benzol. Such a rubber cement has sufficient adhering qualities in itself to stick to the metal parts of the closure and also stick or firmly adhere to the rubber gasket, thereby serving as a means for attaching the gasket to the closure. Rotating within this tank 1 is a roller 3, which is rotated in the direction of the arrow. A scraper 4, coöperating with the roller, causes a thin film of the cement to be formed on the surface of the roller. The closure is indicated at 5. Said closure has a cap portion 6 which is bent so as to provide a seat 7 adjacent which is a depending flange 8. The closures are rolled along a support 9 by means of a belt 10, or other suitable means, and this support 9 is so positioned that the extreme edge of the depending flange 8 makes contact with the roller 3 and scrapes therefrom the thin film of coating material carried on the surface of the roller. This lies in the form of a coating or lining 11, both on the inner face of the seat 7 and the inner face of the depending flange 8. After the coating has been applied, it is allowed to stand for a sufficient time in order that the benzol, or other solvent matter may evaporate from the solution.

The rubber gasket is indicated at 12 in the drawings. Said gasket is in ring form, and, as shown, is preferably rectangular in cross section. This gasket is formed from vulcanized rubber—that is, rubber having a sufficient quantity of a vulcanizing agent to form an elastic gasket which has little or no adhering qualities within itself. The rubber gasket 12 is placed on a mandrel 13 which is formed with a seat 14 and a vertical wall 15. The closure is placed over the rubber gasket on the mandrel and pressure applied to the closure by a pressure pad 16. Either the mandrel or the pressure pad may be heated in any suitable way—as by means of gas burners. Such pad will retain sufficient heat so as to heat the metal parts of the closure. The pressure causes the rubber gasket to make intimate contact with the rubber cement or coating both on the seat 7 and on the flange 8. The heat softens the cement and aids materially in firmly securing the rubber gasket both to the seat and the flange. If a small portion of a vulcanizing agent is placed in the rubber cement the heat may be sufficient to vulcanize the cement and cause it to become in a measure, a part of the rubber gasket. This rubber cement firmly adheres to the metal parts of the closure and also to the side walls of the gasket and serves thereby as a securing means for uniting the gasket so firmly to the closure that it will not be dislodged therefrom by handling or shipping.

From some certain aspects of the invention the gasket may be applied to the closure by pressure alone without the use of heat. It may also be applied before the rubber cement has thoroughly dried. The essential features consist in the coating of the parts of the closure with a rubber cement; the forming of the gasket with vulcanized rubber; and then the pressing of the gasket against the cement or the firmly seating of the gasket and the securing of the same to the closure.

In Fig. 4 of the drawings, I have shown a receptacle at 17, having a seating shoulder 18, which is adapted to be engaged by the rubber gasket when the closure is applied to the receptacle. It is obvious, of course, that the shaping of the closure; also the shaping of the receptacle, may be greatly varied without departing from the spirit of the invention.

The closure with the gasket applied, as an article of manufacture, forms no part of the present invention, but is shown, described and claimed in my co-pending application, Serial No. 322,043, filed of even date herewith.

Having thus described my invention, what I claim as new and desire to secure by Letters Patent of the United States, is:

1. The method of forming a closure for receptacles comprising shaping said closure and forming a gasket seat thereon, forming a vulcanized rubber ring gasket, applying a relatively thin coating of adhesive rubber cement to the seat on said cap portion, placing said preformed gasket thereon, and applying pressure to the gasket for causing said adhesive rubber cement to firmly adhere both to the gasket and the closure for securing the gasket to said closure.

2. The method of forming a closure for receptacles comprising shaping the closure and forming a gasket seat thereon, and a depending flange adjacent said gasket seat, applying a relatively thin coating of rubber cement onto the inner face of said seat and depending flange, permitting said coating to dry, forming a vulcanized rubber ring gasket, placing said preformed gasket on the closure seat, and applying pressure to the gasket for causing said adhesive rubber cement to firmly secure the gasket to the seat and flange of the closure.

3. The method of forming a closure for receptacles comprising shaping the closure and forming a gasket seat thereon and a depending flange adjacent said gasket seat, applying a relatively thin coating of rubber cement onto the inner face of said seat and depending flange, permitting said coating to dry, forming a vulcanized rubber ring gasket, placing said preformed gasket on the closure seat, applying pressure to the gasket for causing said adhesive rubber cement to firmly secure the gasket to the seat and flange of the closure, and applying heat to the closure for softening the cement.

4. The method of forming a closure for receptacles comprising shaping the closure and forming a gasket seat thereon, and a depending flange adjacent said seat, applying a rubber cement onto the inner face of said flange and seat, permitting said cement to dry, forming a vulcanized rubber ring gasket, placing said preformed gasket on a mandrel adapted to engage the inner and outer faces of said ring gasket, applying said closure to the gasket on the mandrel, and applying pressure and heat to the closure, whereby the gasket is caused to firmly contact with the cement on the seat and depending flange.

5. The method of applying gaskets to closures for receptacles comprising applying a coating of rubber cement to the cover, pressing a gasket of vulcanized rubber into contact with the cement under the influence of heat whereby the cement is heated and softened and the gasket is caused to firmly adhere to the cover.

6. The method of applying gaskets to closures for receptacles comprising applying a coating of rubber cement to the cover and applying a gasket of vulcanized rubber to said cement under pressure to cause said adhesive rubber cement to firmly adhere both to the gasket and to the cover for securing the gasket to said closure.

7. The method of applying gaskets to closures for receptacles comprising applying a coating of rubber cement containing a vulcanized agent to the closure, pressing a gasket of vulcanized rubber into contact with the cement under the influence of heat whereby the gasket is caused to firmly adhere to the cover.

In testimony whereof, I affix my signature.

THOMAS LUCIEN TALIAFERRO.